United States Patent
Stojanovski et al.

(10) Patent No.: US 11,930,413 B2
(45) Date of Patent: *Mar. 12, 2024

(54) NETWORK INITIATED CONNECTION TRANSFER

(71) Applicant: Apple Inc., Cupertino, CA (US)

(72) Inventors: Alexandre S. Stojanovski, Paris (FR); Muthaiah Venkatachalam, Beaverton, OR (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/855,137

(22) Filed: Jun. 30, 2022

(65) Prior Publication Data

US 2022/0338083 A1    Oct. 20, 2022

Related U.S. Application Data

(63) Continuation of application No. 16/835,040, filed on Mar. 30, 2020, now Pat. No. 11,405,836, which is a continuation of application No. 15/765,542, filed as application No. PCT/US2016/028281 on Apr. 19, 2016, now Pat. No. 10,609,740.

(60) Provisional application No. 62/239,750, filed on Oct. 9, 2015.

(51) Int. Cl.
| | |
|---|---|
| *H04W 4/00* | (2018.01) |
| *H04L 61/4511* | (2022.01) |
| *H04L 61/5007* | (2022.01) |
| *H04W 36/00* | (2009.01) |
| *H04W 36/12* | (2009.01) |
| *H04W 36/28* | (2009.01) |
| *H04W 76/12* | (2018.01) |
| *H04W 88/16* | (2009.01) |
| *H04L 101/35* | (2022.01) |

(52) U.S. Cl.
CPC ......... *H04W 36/12* (2013.01); *H04L 61/4511* (2022.05); *H04L 61/5007* (2022.05); *H04W 36/0033* (2013.01); *H04W 36/28* (2013.01); *H04W 76/12* (2018.02); *H04W 88/16* (2013.01); *H04L 2101/35* (2022.05)

(58) Field of Classification Search
None
See application file for complete search history.

(56) References Cited

U.S. PATENT DOCUMENTS

| | | |
|---|---|---|
| 8,295,830 B1 | 10/2012 | Faccin |
| 8,761,007 B1 | 6/2014 | Damle et al. |
| 9,510,256 B2 | 11/2016 | Krishna et al. |
| 9,942,909 B2 | 4/2018 | Kaippallimalil et al. |

(Continued)

FOREIGN PATENT DOCUMENTS

| | | |
|---|---|---|
| CN | 101026861 A | 8/2007 |
| CN | 101350952 A | 1/2009 |

(Continued)

OTHER PUBLICATIONS

"Digital Communications", Research on EPC Core Network Planning and Deployment Strategy, Dec. 25, 2014.

(Continued)

*Primary Examiner* — Bob A Phunkulh
(74) *Attorney, Agent, or Firm* — Kilpatrick Townsend & Stockton LLP

(57) ABSTRACT

Apparatus, systems, and methods for a network-initiated packet data network connection in communication systems are described.

19 Claims, 13 Drawing Sheets

(56) References Cited

U.S. PATENT DOCUMENTS

| | | | |
|---|---|---|---|
| 10,609,740 | B2 | 3/2020 | Stojanovski et al. |
| 11,218,928 | B2 | 1/2022 | Teyeb et al. |
| 11,405,836 | B2 | 8/2022 | Stojanovski et al. |
| 2009/0109986 | A1 | 4/2009 | Zhao et al. |
| 2009/0316656 | A1 | 12/2009 | Zhao et al. |
| 2011/0007748 | A1 | 1/2011 | Yin et al. |
| 2011/0058479 | A1 | 3/2011 | Chowdhury |
| 2011/0242975 | A1 | 10/2011 | Zhao et al. |
| 2012/0082029 | A1 | 4/2012 | Liao |
| 2012/0134259 | A1 | 5/2012 | Bonnier et al. |
| 2012/0300615 | A1 | 11/2012 | Kempf et al. |
| 2012/0303835 | A1 | 11/2012 | Kempf et al. |
| 2012/0307799 | A1 | 12/2012 | Taleb et al. |
| 2013/0003697 | A1 | 1/2013 | Adjakple et al. |
| 2013/0083721 | A1 | 4/2013 | Wu et al. |
| 2013/0089076 | A1 | 4/2013 | Olvera-Hernandez et al. |
| 2013/0223226 | A1 | 8/2013 | Narayanan et al. |
| 2013/0279420 | A1 | 10/2013 | Nishida et al. |
| 2013/0279421 | A1 | 10/2013 | Nishida et al. |
| 2014/0016553 | A1 | 1/2014 | Nishida et al. |
| 2014/0098791 | A1 | 4/2014 | Wu et al. |
| 2014/0169332 | A1 | 6/2014 | Taleb et al. |
| 2014/0193154 | A1 | 7/2014 | Graham et al. |
| 2014/0307682 | A1 | 10/2014 | Xiong |
| 2014/0331296 | A1 | 11/2014 | Faccin |
| 2014/0342738 | A1 | 11/2014 | Ishii |
| 2015/0029956 | A1 | 1/2015 | Moses et al. |
| 2015/0085845 | A1 | 3/2015 | Wang et al. |
| 2015/0156660 | A1 | 6/2015 | Luo |
| 2015/0189563 | A1 | 7/2015 | Chan et al. |
| 2015/0195752 | A1 | 7/2015 | Trang et al. |
| 2015/0195767 | A1 | 7/2015 | Trang et al. |
| 2015/0223133 | A1 | 8/2015 | Stojanovski et al. |
| 2015/0249999 | A1 | 9/2015 | Kaippallimalil et al. |
| 2015/0289224 | A1 | 10/2015 | Kabadi et al. |
| 2015/0350989 | A1 | 12/2015 | Himayat et al. |
| 2016/0037411 | A1 | 2/2016 | Franklin et al. |
| 2016/0050604 | A1 | 2/2016 | Lee et al. |
| 2016/0080995 | A1 | 3/2016 | Singh et al. |
| 2016/0119157 | A1 | 4/2016 | Hua et al. |
| 2016/0212773 | A1 | 7/2016 | Kanderholm et al. |
| 2016/0219480 | A1 | 7/2016 | Roeland et al. |
| 2016/0249256 | A1 | 8/2016 | Kweon et al. |
| 2016/0286451 | A1 | 9/2016 | Ahmad et al. |
| 2017/0026824 | A1 | 1/2017 | Kim et al. |
| 2017/0034122 | A1 | 2/2017 | Hoffmann |
| 2017/0070923 | A1 | 3/2017 | Li et al. |
| 2017/0078911 | A1 | 3/2017 | Jeong et al. |
| 2017/0078927 | A1 | 3/2017 | Hahn |
| 2017/0231020 | A1 | 8/2017 | Tomici et al. |
| 2017/0231026 | A1 | 8/2017 | Vesterinen et al. |
| 2017/0251405 | A1 | 8/2017 | Stojanovski et al. |
| 2018/0167854 | A1 | 6/2018 | Enomoto et al. |
| 2018/0213007 | A1 | 7/2018 | Barese et al. |
| 2018/0234346 | A1 | 8/2018 | Liu et al. |
| 2018/0242201 | A1 | 8/2018 | Aminaka |
| 2018/0249317 | A1 | 8/2018 | Kurasugi et al. |
| 2018/0310350 | A1 | 10/2018 | Stojanovski et al. |

FOREIGN PATENT DOCUMENTS

| | | | |
|---|---|---|---|
| CN | 101518126 | A | 8/2009 |
| CN | 101052212 | B | 9/2010 |
| CN | 102045692 | A | 5/2011 |
| CN | 102137474 | A | 7/2011 |
| CN | 102763441 | A | 10/2012 |
| CN | 102791010 | A | 11/2012 |
| CN | 103380641 | A | 10/2013 |
| CN | 103533666 | A | 1/2014 |
| CN | 108029060 | A | 5/2018 |
| DE | 112016004595 | T5 | 7/2018 |
| WO | 2009034071 | A2 | 3/2009 |
| WO | 2017062065 | A1 | 4/2017 |

OTHER PUBLICATIONS

"IP Address Management in DMM", Huawei Technologies, Internet Engineering Task Force, IETF; Standardworkingdraft, Internet Society (ISOC), Oct. 27, 2014, pp. 1-7.

U.S. Appl. No. 15/765,542 , Non-Final Office Action, dated Oct. 10, 2019, 18 pages.

U.S. Appl. No. 16/835,040 , Final Office Action, dated Jan. 12, 2022, 18 pages.

U.S. Appl. No. 16/835,040 , Non-Final Office Action, dated Sep. 2, 2021, 14 pages.

Chinese Patent Application No. 201680052149.1 , Notice of Decision to Grant, dated Sep. 28, 2020, 10 pages.

Chinese Patent Application No. 201680052149.1 , Office Action, dated May 8, 2020, 12 pages.

Hong Kong Patent Application No. 18113724.6 , "Notification of Publication of the Request to Record", Jun. 28, 2019, 2 pages.

International Patent Application No. PCT/US2016/028281 , International Preliminary Report on Patentability, dated Apr. 10, 2018, 7 pages.

International Patent Application No. PCT/US2016/028281 , International Search Report and Written Opinion, dated Jul. 1, 2016, 10 pages.

NETWORK INITIATED CONNECTION TRANSFER

CROSS-REFERENCES TO RELATED APPLICATIONS

This is a continuation of U.S. patent application Ser. No. 16/835,040, filed Mar. 30, 2020, which claims the benefit of U.S. patent application Ser. No. 15/765,542, filed Apr. 3, 2018, now U.S. Pat. No. 10,609,740, which claims priority under 35 U.S.C. § 371 to International Application No. PCT/US2016/028281, filed Apr. 19, 2016, which in turn claims the benefit of priority under 35 U.S.C. § 119(e) of U.S. Provisional Patent Application No. 62/239,750, filed Oct. 9, 2015, each of which is incorporated herein by reference in their entirety.

BACKGROUND OF THE INVENTION

Techniques to implement a network-initiated packet data network connection may find utility, e.g., in electronic communication systems for electronic devices.

BRIEF SUMMARY OF THE INVENTION

The present disclosure generally relates to the field of electronic communication. More particularly, aspects generally relate to a network-initiated packet data network connection in communication systems.

BRIEF DESCRIPTION OF THE DRAWINGS

The detailed description is provided with reference to the accompanying figures. The use of the same reference numbers in different figures indicates similar or identical items.

Figure 1:
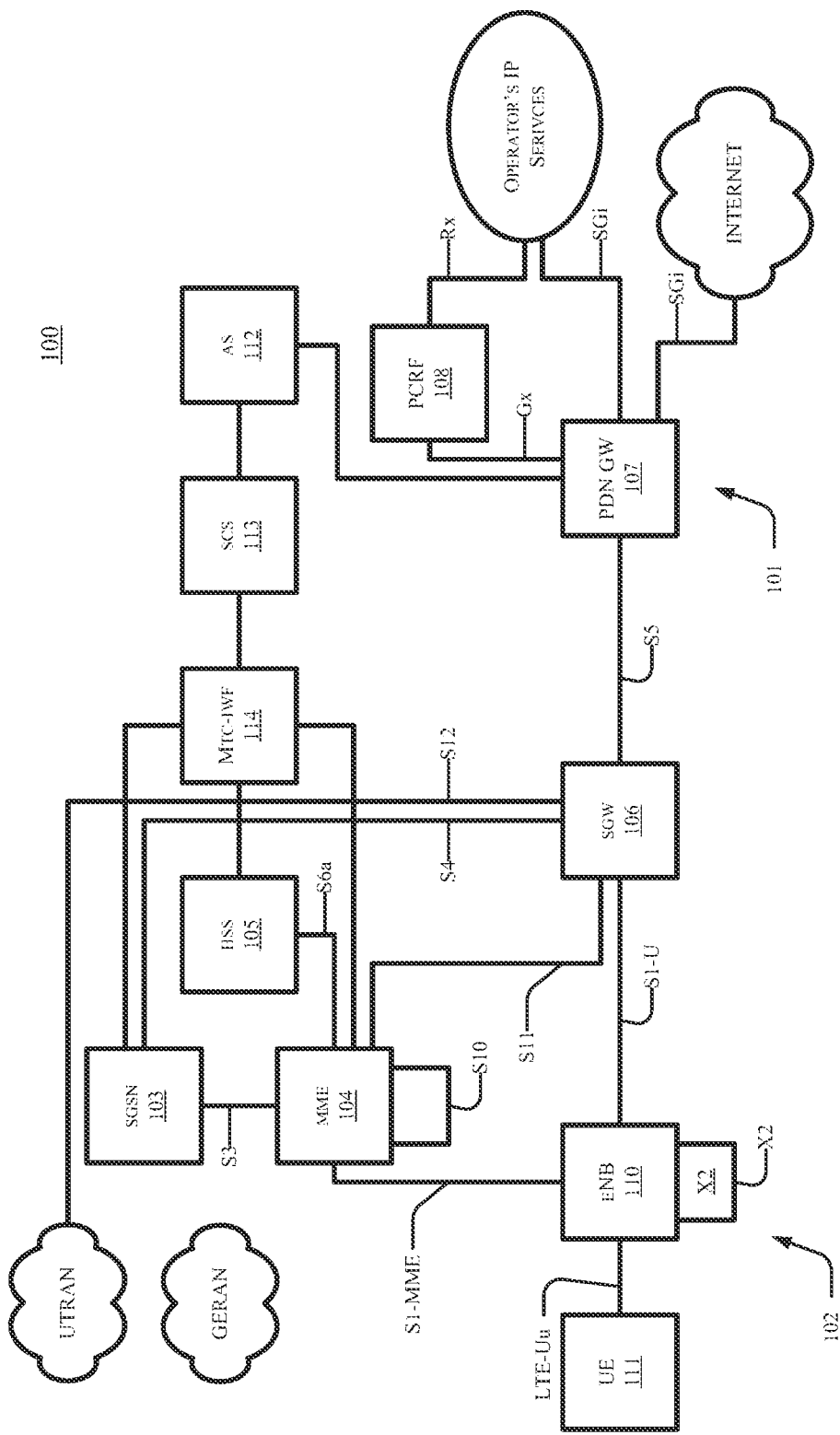
FIG. 1 is a schematic, block diagram illustration of components in a 3GPP LTE network which may implement a network-initiated packet data network connection in communication systems in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION OF THE INVENTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Service continuity in mobile networks is sometimes perceived as being synonymous with internet protocol (IP) address preservation. To enable service continuity, a mobile device may be assigned an internet protocol (IP) address that is hosted at an "IP anchor" node, i.e., the packet gateway (PGW) in the core network. Traffic between the mobile device and the IP anchor node may be tunneled, whereas IP routing is used only within the packet data network that starts at the IP anchor node. A tunneled data path may lead to inefficient resource use in certain scenarios (e.g., two UEs under the same eNB communicating with each other via a long hairpin).

Various applications today can survive an IP address change. One example of such applications includes Session Initiation Protocol (SIP) based applications, in which a "SIP reINVITE" message is sent to update the remote party of a new IP address that will be used as the contact address for future user plane traffic. Another example includes Dynamic Adaptive Streaming over HTTP (DASH) based applications which can survive a change in IP address and resume with content delivery from a different content distribution server. This is enabled by associating the content segments with globally unique transport-independent labels (URLs) so that the streaming client can always determine the next-in-line content segment and request it from the content distribution network (including from a different server).

Service continuity can also be ensured at the transport layer by using evolved transport protocols such as MultiPath TCP (MPTCP). A MPTCP client can dynamically add or remove subflows carried over different IP addresses, without affecting the byte-stream transported on behalf of the application.

With ever-increasing multimedia broadband data volumes, it may be useful for a 3GPP system could select an IP anchor node (i.e., a PGW) that is located close to the radio access network edge and to the current location of a user equipment (UE). This would allow IP traffic to be offloaded from the 3GPP system user plane onto traditional IP routing networks close to the network edge, which reduces the tunneled segment of the data path and increases the IP routed part. This increases the scalability of the 3GPP system user plane nodes, enhances the end-to-end communication path by avoidance of triangular routing via the IP anchor node, and lowers end-to-end latency of data transmission. Further, content delivery may be resumed from a content distribution server geographically closer to the UE, which further reduces the traffic load on the 3GPP network.

A 3GPP communication system can use the Selected IP Traffic Offload (SIPTO) feature to offload traffic by assigning a new, geographically closer, PGW node when the existing PGW node is deemed suboptimal. With SIPTO, however, the communication system first releases the existing PGW node before acquiring a new PGW node and a new IP address, which makes it a "break-before-make" type of solution. While adaptive streaming applications can survive the IP address change, the temporary loss of connection may still be noticeable to the user depending upon factors such as the amount of buffered segments in the UE, the streaming rate, the time needed for re-establishment of HTTPS connection, etc.

It may be useful for a 3GPP communication system to leverage capabilities of the upper layer protocols (i.e., applications and/or transport layer) to facilitate surviving the IP address change. By knowing that applications can survive an IP address change, a communication system can establish a connection with a new IP anchor node before releasing the old IP anchor node. This requires a UE to maintain connections to both IP anchor nodes during the transition period. Once the traffic is consolidated on the new IP address (e.g., by leveraging SIP reINVITE, DASH or MPTCP mechanisms), the system can release the connection to the old IP anchor node.

Features and characteristics of techniques to implement a network-initiated packet data network connection in communication systems and communication systems in which the techniques may be incorporated are described below with reference to FIGS. 1-14.

FIG. 1 shows an exemplary block diagram of the overall architecture of a 3GPP LTE network 100 that includes one or more devices that are capable of implementing methods to implement a network-initiated packet data network connection in communication systems according to the subject matter disclosed herein. FIG. 1 also generally shows exemplary network elements and exemplary standardized interfaces. At a high level, network 100 comprises a core network (CN) 101 (also referred to as an evolved Packet System (EPC)), and an air-interface access network, evolved universal terrestrial radio access network (EUTRAN) 102. CN 101 is responsible for the overall control of the various User Equipment (UE) connected to the network and establishment of the bearers. CN 101 may include functional entities, such as a home agent and/or an ANDSF server or entity, although not explicitly depicted. The EUTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gateway (SGW) 106, a packet data network (PDN) Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the EUTRAN 102 is formed by at least one node, such as evolved NodeB (base station (BS), eNB or eNodeB) 110, which connects to one or more User Equipment (UE) 111, of which only one is depicted in FIG. 1. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of the EUTRAN 102 provides one substantially localized geographical transmission point (having multiple antenna devices) that provides access to one or more UEs. In another exemplary configuration, a single cell of the EUTRAN 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in EUTRAN; hence the EUTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 2:
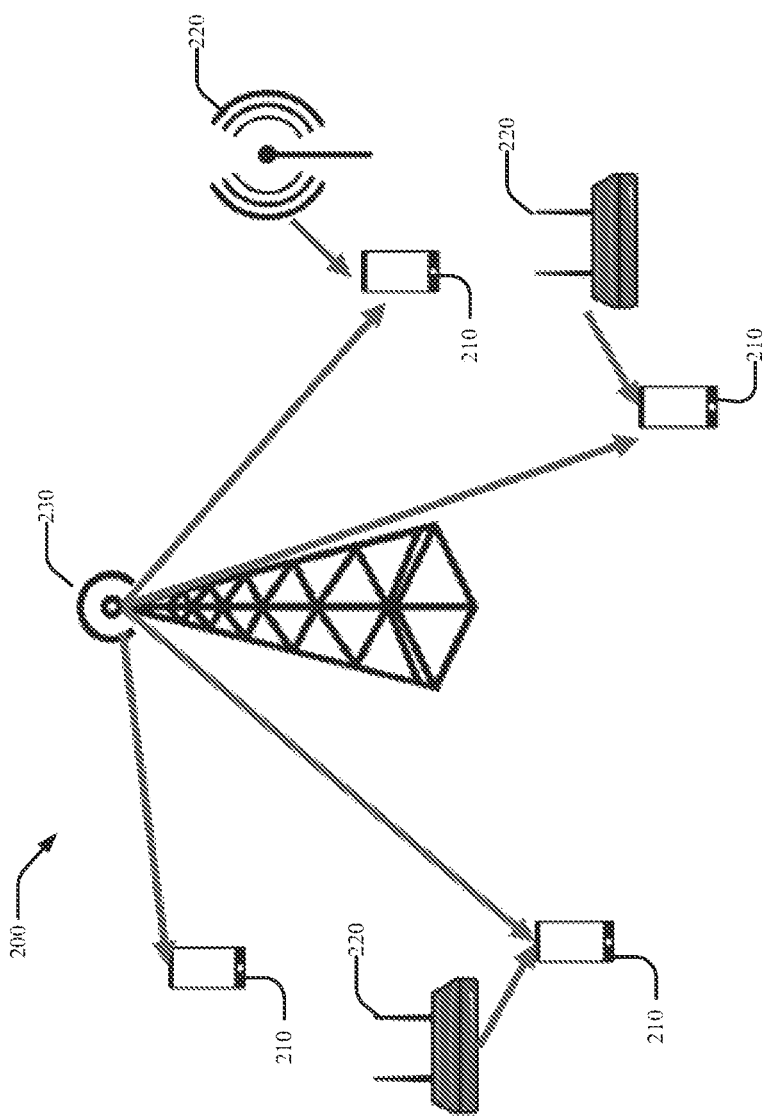
FIG. 2 is a schematic illustration of a network architecture in which a network-initiated packet data network connection in communication systems may be implemented in accordance with various examples discussed herein.

FIG. 2 is a schematic illustration of a network architecture for a communication system 200 which may implement a network-initiated packet data network connection in accordance with various examples discussed herein. System 200 may comprise one or more cells, each of which may comprise one or more sectors. Each cell comprises at least one base station (BS) 230. A plurality of UEs 210 may be located throughout system 200. System 200 may further include one or more access points 220 which may transport traffic from UEs 210 to a communication network.

A base station 230 can be embodied as, but is not limited to, an evolved NodeB (eNB or eNodeB), a macro-cell base station, a pico-cell base station, a femto-cell base station, or the like. A UE 210 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein. Access points 220 may be embodied as, but not limited to, WLAN access points.

Figure 3:
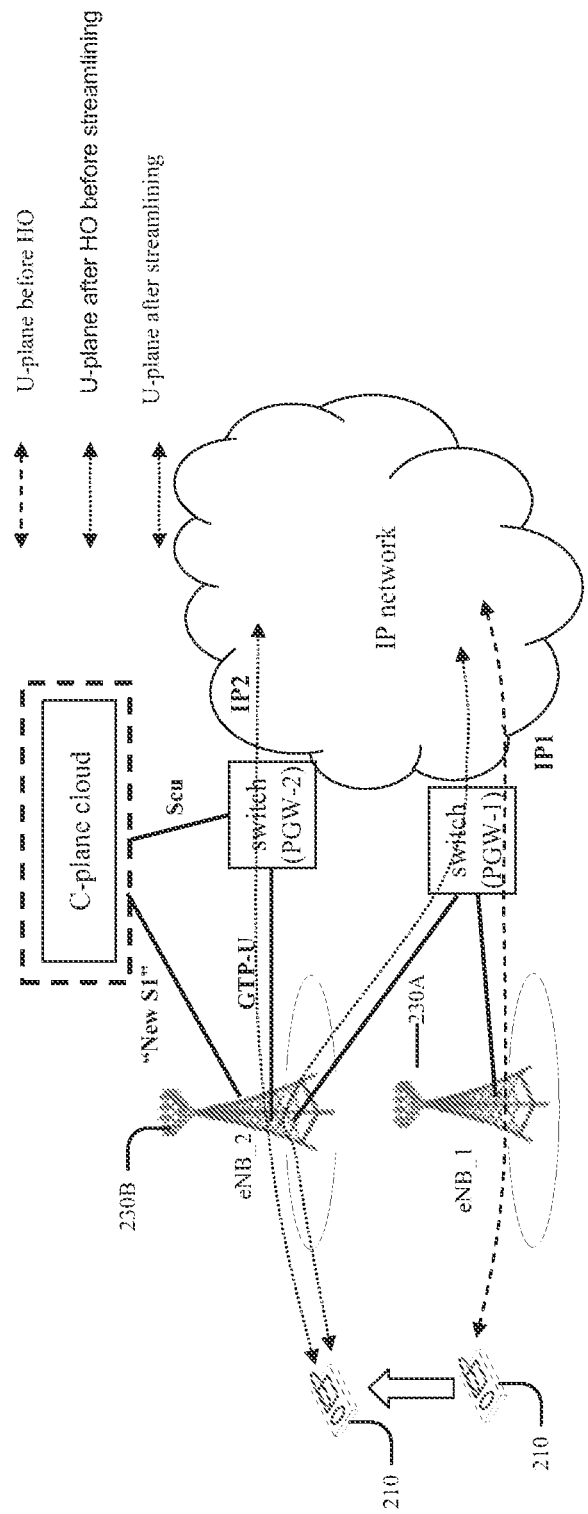
FIG. 3 is a schematic illustration of a first example network architecture in which a network-initiated packet data network connection in communication systems may be implemented in accordance with various examples discussed herein.
Figure 4:
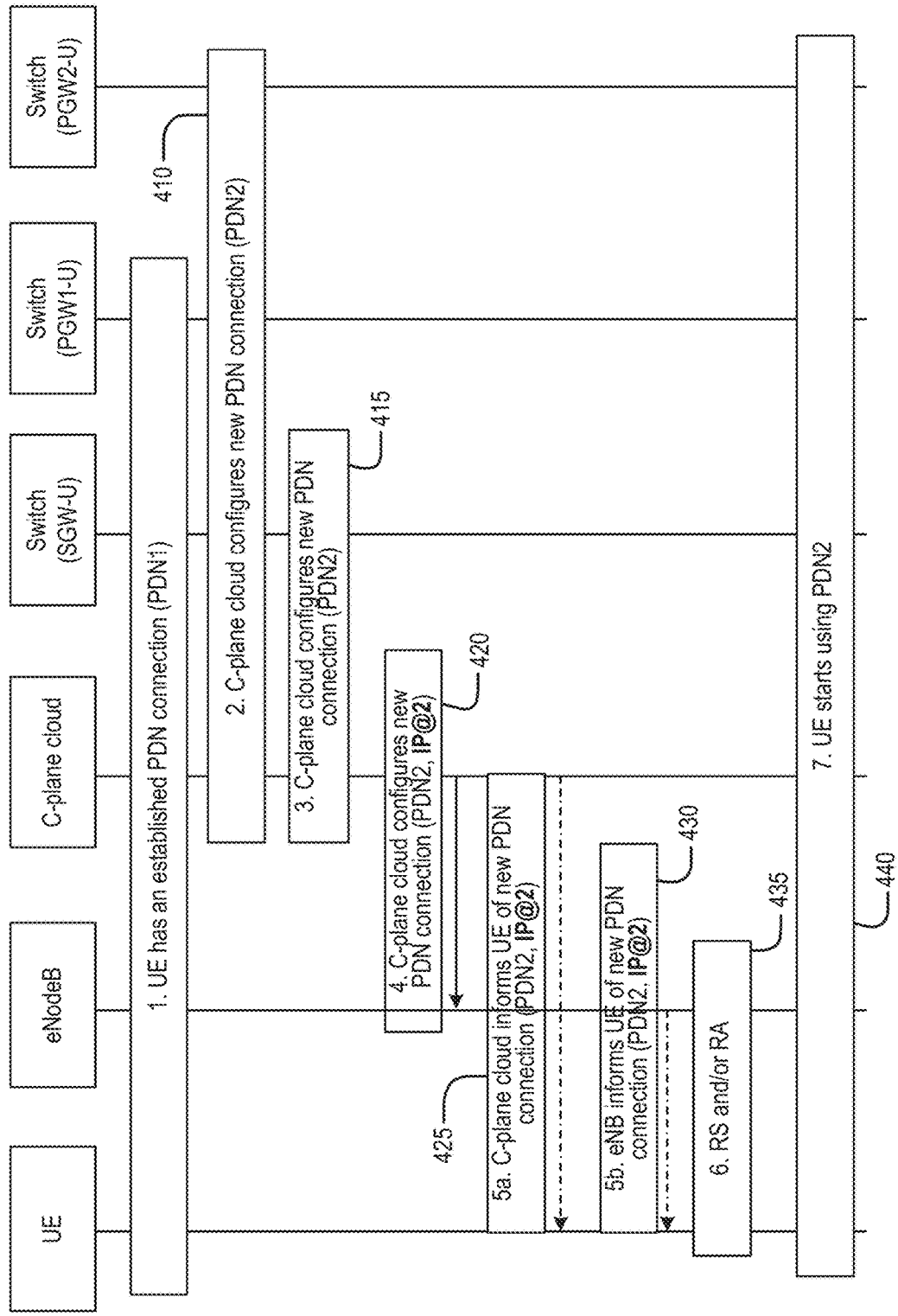
FIG. 4 illustrates high-level operations in a method to implement a network-initiated packet data network connection in communication systems in accordance with various examples discussed herein.

FIGS. 3-4 depict a first example of a network-initiated packet data network connection in communication systems. In the example depicted in FIGS. 3-4 a UE 210 may move from a coverage area serviced by a first eNB 230A to a coverage area services by a second eNB 230B, thereby triggering a change in a packet data network connection for the UE 210. Referring to FIG. 3, at a first point in time UE 210 may be serviced by a first eNB 230A, which is coupled to a first packet data network gateway PGW-1, which provides a first packet data network connection to an IP network, e.g., the Internet. At a second point in time, UE 210 may move to a different location in which coverage is provided by a second eNB 230B, which is coupled to a second packet data network gateway PGW-2, which provides a second packet data network connection to an IP network, e.g., the Internet.

FIG. 4 depicts operations to implement a network-initiated packet data network connection in the operating context depicted in FIG. 3. Referring to FIG. 4, UE 210 is initially in a coverage area serviced by the first eNB 230A and has an established packet data network connection (PDN1) provided by a first packet data network gateway (PGW-1). The packet data network connection involves the first eNB 230A, a user-plane part of the first packet data network gateway PGW1 and may include one or more intermediate user plane nodes providing SGW functionality. UE 210 is assigned an IP address/prefix (i.e., IP@1). It will be noted that the presence of any intermediate U-plane nodes (including those with SGW-U functionality) is omitted from the figure for simplicity. Further, it will be noted that although FIG. 3 depicts GTP-U as an example of tunneling protocol in the user plane, other tunneling protocols (e.g., GRE) may be used.

When UE 210 moves from a coverage area serviced by the first eNB 230A to a coverage area serviced by the second eNB 230B the network determines that backhauling the traffic to the first packet data network gateway (PGW-1) is no longer optimal and it may be useful to change the IP anchor. In some examples this determination may be made by circuitry in an eNB. In other examples this determination may be made by circuitry in a different network entity, e.g., by a network entity in the control plane (C-plane) cloud.

In some examples a network entity in the C-plane cloud selects a new packet data network function (PGW2) that is geographically closer to the current location of the UE 210 and configures (operation 410) a user plane function in a second packet data network gateway, e.g., PGW2 for the new packet data network connection. The configuration parameters may include at least a tunnel endpoint transport address for a tunnel toward the next-hop U-plane node (e.g., an SGW node that is used for PDN1). In the process packet data network gateway PGW2 allocates the new IP address/prefix (IP@2) and sends it to a network entity in the C-plane cloud.

In response to a determination to switch the UE 210 from the first packet data network connection managed by the first packet data network gateway (PGW-1) to a second packet data network connection managed by a second packet data network gateway (PGW-2) the network configures (operation 415) the second packet data network gateway (PGW-2) and any intermediate U-plane node. For example, a network entity in the C-plane cloud configures the next-hop U-plane node (in this example the same SGW-U that is used for PDN1). The configuration parameters include at least a tunnel endpoint transport addresses for a tunnel towards the next-hop U-plane nodes, e.g., the eNB on one side and PGW2 on the other side.

A network entity in the C-plane cloud configures a new PDN connection in the second eNB 230B (operation 420). In some examples the configuration parameters may include a tunnel endpoint transport addresses for a tunnel towards the next-hop U-plane node, e.g., the SGW2 node, and the new IP address/prefix (IP@2).

When the new PDN connection (PDN2) is configured, the network entity informs UE 210 of the availability of PDN2 and invites the UE 210 to start using a new IP address/prefix (IP@2). This information may be provided either from a network entity in the C-plane cloud (operation 425) or from second eNB 230B (operation 430), depending on the split between access stratum (AS) and non-access stratum (NAS) signaling in the 5G evolved packet system. For example, AS signaling allows the UE to communicate directly with the eNB using a radio resource control (RRC) protocol. NAS signaling allows the UE to communicate directly with a network entity (e.g., in the C-plane cloud) in messages which are carried as transparent containers over RRC (e.g., between UE and eNB) and over S1-AP (e.g., between eNB and network entities in the C-plane cloud).

When IPv6 is used the eNB 230B, acting in the role of default IP router, sends (operation 435) a Router Advertisement (RA) message containing the new IPv6 prefix (IP@2) allowing the UE 210 to perform stateless address autoconfiguration with this prefix. The UE may optionally use Router Solicitation to trigger the RA.

Based on the information received during the configuration process the UE 210 starts using IP@2 for new traffic (operation 440) and moves traffic from existing applications (where possible) on the new IP interface by leveraging upper layer mobility mechanisms (e.g., SIP reINVITE, DASH, MPTCP).

Figure 5:
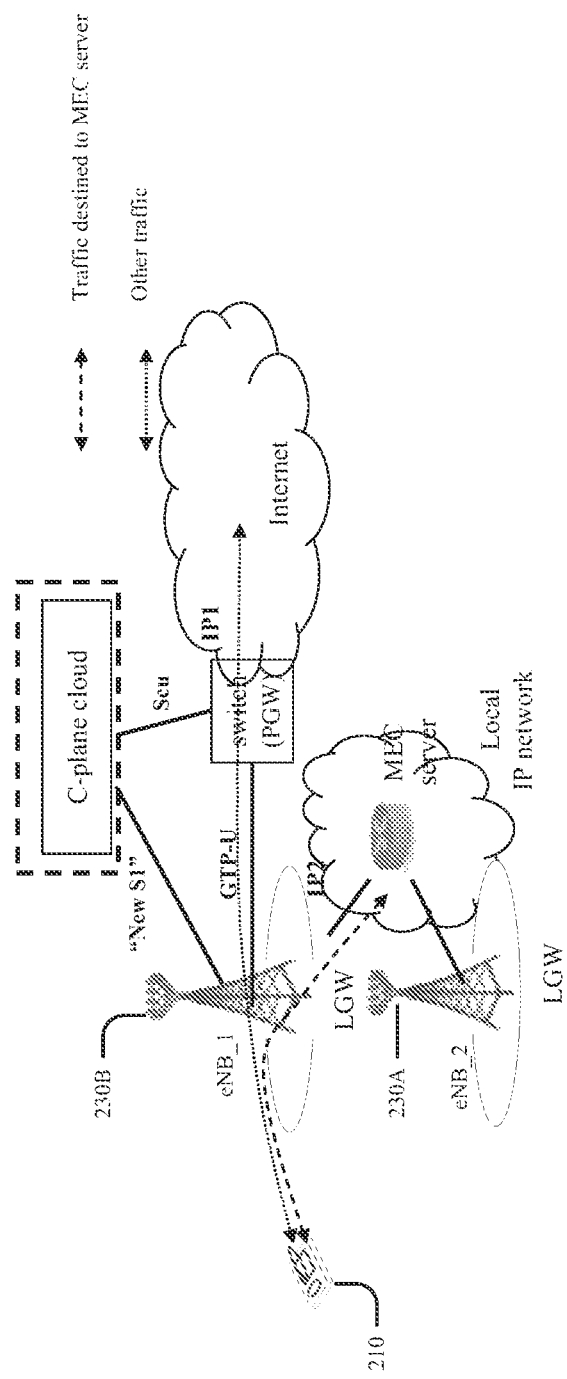
FIG. 5 is a schematic illustration of a second example network architecture in which a network-initiated packet data network connection in communication systems may be implemented in accordance with various examples discussed herein.
Figure 6:
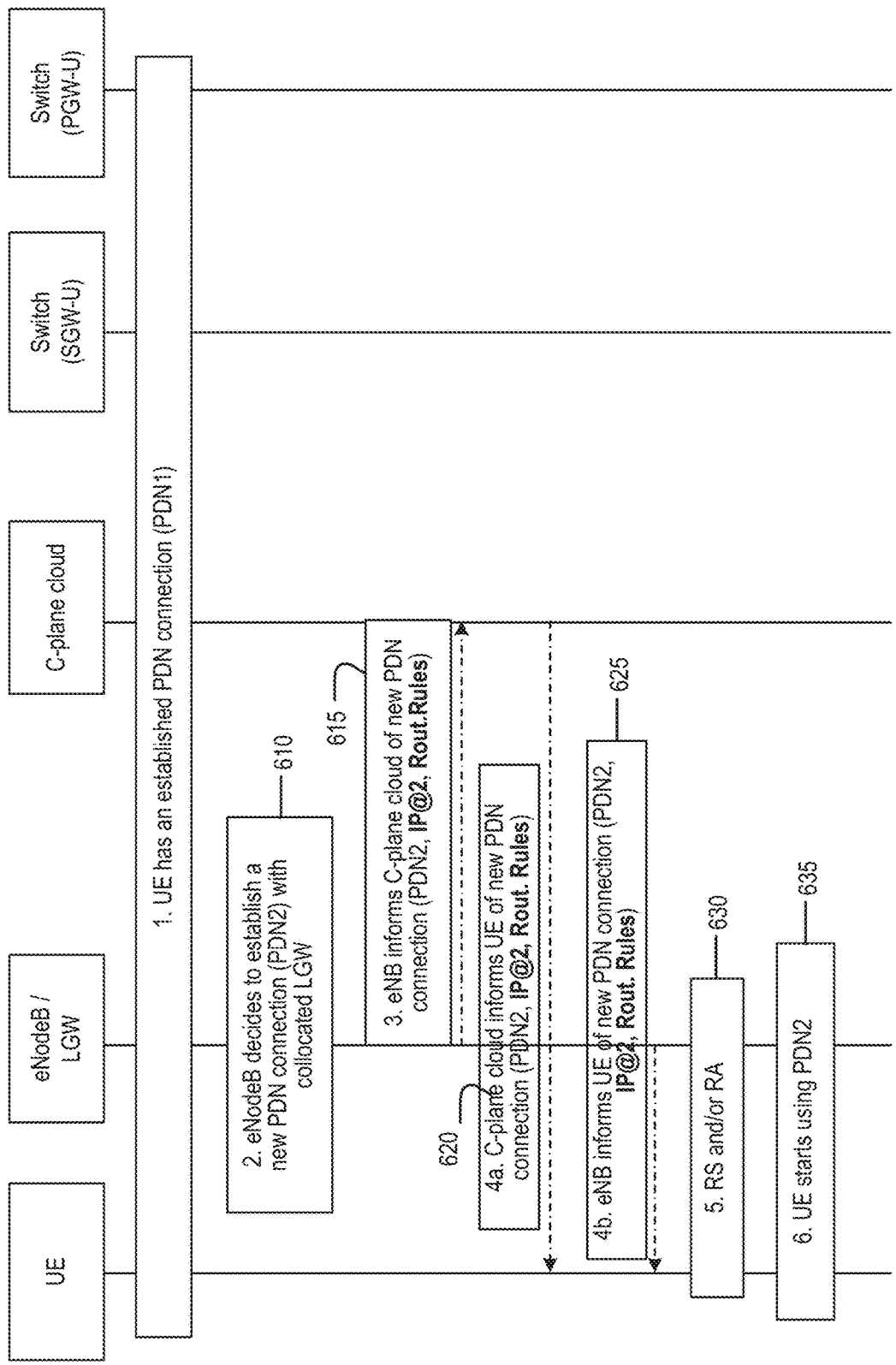
FIG. 6 illustrates high-level operations in a method to implement a network-initiated packet data network connection in communication systems in accordance with various examples discussed herein.

FIGS. 5-6 depict a second example of a network-initiated packet data network connection in communication systems. In the example depicted in FIGS. 5-6 a UE 210 may operate in a Mobile Edge Computing (MEC) environment where IT and cloud-computing capabilities are provided within the Radio Access Network (RAN) in close proximity to user equipment 210. Mobile Edge Computing allows content, services and applications to be accelerated, increasing responsiveness from the edge of the network.

A MEC server (e.g., a Content Distribution Network (CDN) server) may be either collocated with an eNB or is located in proximity of the eNB. In the latter case the MEC server is reachable via a local IP network and may be shared by multiple eNBs. In the collocated case the eNB inspects all IP packets and redirects eligible packets to the collocated MEC server. In this case there is no need for assigning a new IP address/prefix to the UE.

By contrast, when a MEC server is a standalone server then it may be beneficial for the UE to use a different IP address/prefix. If it does not, the eNB applies a NAT functionality which is undesirable in general, and for IPv6 in particular. In this case the eNB initiates a network-initiated PDN connection with a collocated Local Gateway (LGW) functionality.

Note that in some examples the UE has access to two different packet data networks (e.g. to the Internet and to a local IP network) and the UE needs to be provided with routing policies that assist the UE in selecting the appropriate source IP address/prefix, which in turn selects the correct IP network. Examples of routing policies (or routing rules) include the use of Application ID (referring to the application in the UE that originates the packet), FQDN (referring to the FQDN that is being resolved into a destination IP address) and selected fields in the IP packet header (in particular Destination IP address and Protocol). For each of these parameters the routing policy consists in prioritized list of UEs (i.e. "source") IP addresses/prefixes.

FIG. 6 depicts operations to implement a network-initiated packet data network connection in the operating context depicted in FIG. 5. Referring to FIG. 6, UE 210 is initially in a coverage area serviced by the first eNB 230A and has an established packet data network connection (PDN1) provided by a first packet data network gateway (PGW-1). The packet data network connection involves the first eNB 230A, a user-plane part of the first packet data network gateway PGW1 and may include one or more intermediate user plane nodes providing SGW functionality. UE 210 is assigned an IP address/prefix (IP@1).

At operation 610 the eNB determines (e.g., based on packet inspection and analysis of the Destination IP address in the packet header the eNB realizes that a packet flow is destined to a server residing in the Internet that provides the same service as a locally residing MEC server) that it may be useful to change the IP anchor for traffic flows destined to a local MEC server. In some examples this determination may be made by circuitry in the eNB 230A. In other examples this determination may be made by circuitry in a different network entity, e.g., by a network entity in the control plane (C-plane) cloud. In response to the determination, the eNB 230A selects a new packet data network function (PGW2) that includes a co-located LGW functionality.

The eNB 230 informs (operation 615) the network entity in the C-plane cloud of the new packet data network connection including the assigned IP address/prefix (IP@2) and one or more routing rules. Examples of routing rules may include:

Rule 1: for FQDN="youtube.*" use IP@2 first, then IP@1.

Rule 2: for Destination IP address="ff02::1:3" use IP@2 only.

Rule 3: for App ID="XYZ" use IP@2 first, then IP@1.

A network entity informs the UE of the availability of the second packet data network (PDN2) and provides the new IP address/prefix (IP@2) and the routing rules. This information may be provided either from a network entity in the C-plane cloud (operation 620) or from eNB (operation 625), depending on the split between AS and NAS signaling in the packet system.

When IPv6 is used the NB in the role of default IP router (operation 630) sends a Router Advertisement (RA) message to the UE containing the new IPv6 prefix (IP@2) allowing the UE to perform stateless address autoconfiguration with this prefix. The UE may optionally use Router Solicitation to trigger the RA.

When IPv6 is used the eNB 230B, acting in the role of default IP router, sends a Router Advertisement (RA) message containing the new IPv6 prefix (IP@2) allowing the UE 210 to perform stateless address autoconfiguration with this prefix. The UE may optionally use Router Solicitation to trigger the RA.

Based on the information received during the configuration process the UE 210 starts using (operation 635) IP@1 and IP@2 according to the provided routing rules.

Figure 7:
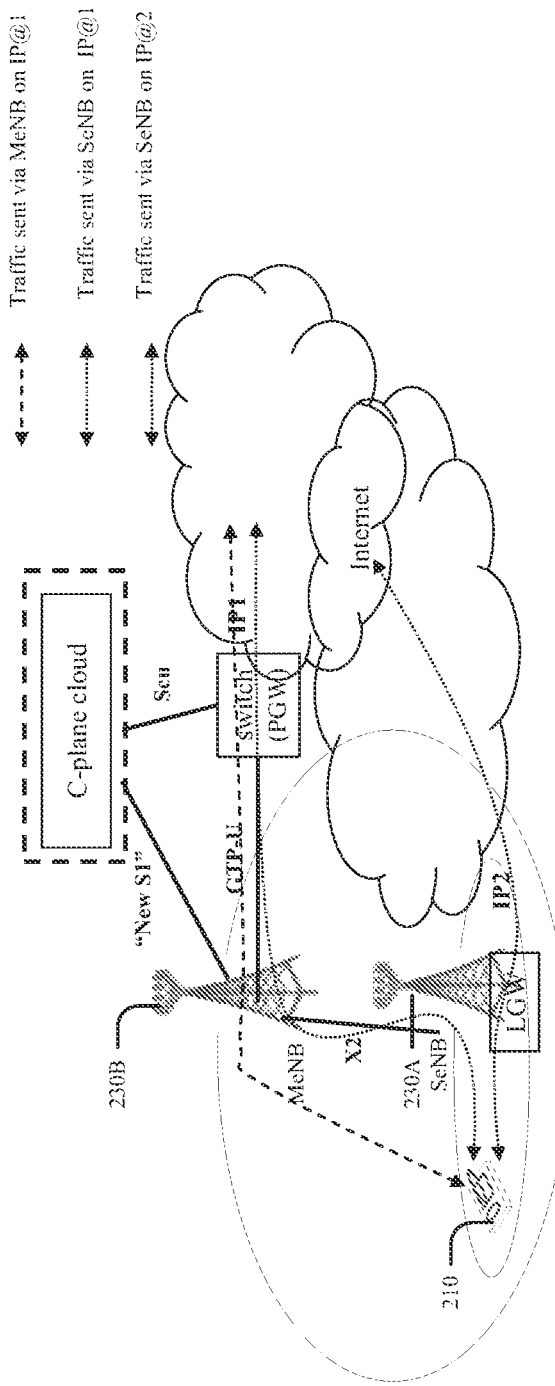
FIG. 7 is a schematic illustration of a third example network architecture in which a network-initiated packet data network connection in communication systems may be implemented in accordance with various examples discussed herein.
Figure 8:
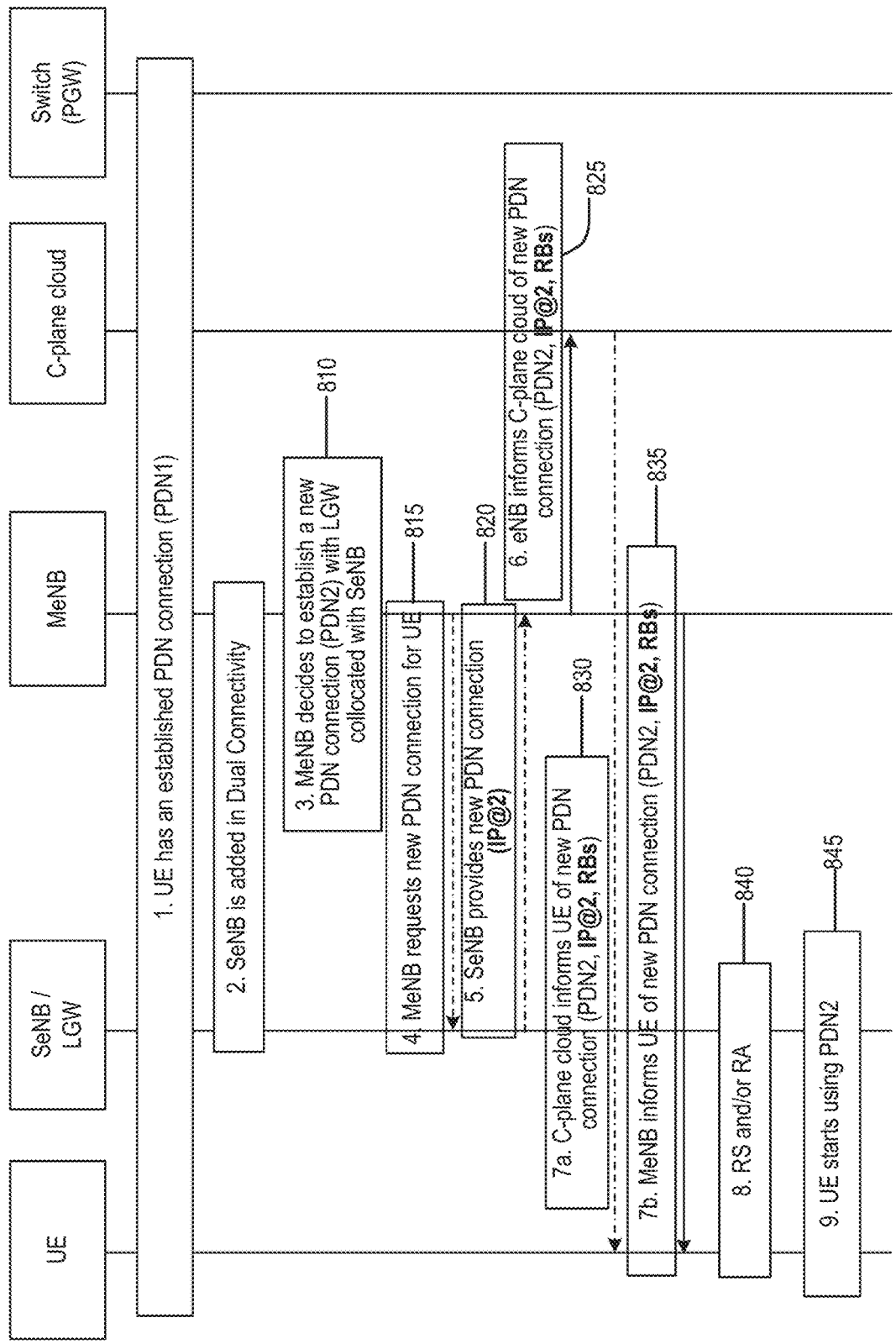
FIG. 8 illustrates high-level operations in a method to implement a network-initiated packet data network connection in communication systems in accordance with various examples discussed herein.

FIGS. 7-8 depict a third example of a network-initiated packet data network connection in communication systems. In the example depicted in FIGS. 7-8 a UE 210 may move from a coverage area serviced by a first eNB 230A to a coverage area services by a booster cell such as a network access point 220. In some examples the UE 210 may maintain connectivity with both the network access point 220 and the eNB 230.

FIG. 8 depicts operations to implement a network-initiated packet data network connection in the operating context depicted in FIG. 7. Referring to FIG. 4, UE 210 is initially in a coverage area serviced by the eNB 230 and has an established packet data network connection (PDN) provided by a first packet data network gateway (PGW). The packet data network connection involves the eNB 230A, a user-plane part of the first packet data network gateway PGW1 and may include one or more intermediate user plane nodes providing SGW functionality. UE 210 is assigned an IP address/prefix (IP@1).

When UE moves from a coverage area serviced by the eNB 230 to an area that is covered by a network access point 220 such as a booster cell (also referred to herein as a Secondary eNB or SeNB), the eNB 230 determines (operation 810) to add the network access point 220 in Dual Connectivity (DC) configuration. When DC mode is active the UE has still only one radio resource control (RRC) connection, which is provided through eNB 230. In other words, the network access point 220 is used only for user plane traffic and the bearers that are routed via the network access point 220 are under control of the eNB 230. The traffic that is exchanged via the network access point 220 is backhauled to/from the packet core network via an X2 communication link. In other examples user plane traffic may be exchanged on a direct interface between the network access point 220 and a serving gateway. In some deployment scenarios it may be beneficial to offload selected traffic flows at the network access point 220 (i.e. at the Secondary eNB).

The eNB 230 forwards (operation 815) a request to the network access point 220 to establish a packet data network connection (PDN2) with the collocated LGW using X2 signaling. In response to the request, the network access point 220 allocates (operation 820) the new IP address/prefix (IP@2) and responds to the eNB 230, which informs (operation 825) a network entity in the C-plane cloud of the new PDN connection including the assigned IP address/prefix (IP@2), also indicating that this is a PDN connection from a network access point 220.

In some examples a network entity in the C-plane cloud informs (operation 830) UE 210 of the availability of the second packet data network (PDN2) and provides the new IP address/prefix (IP@2), also indicating that this is a PDN connection from an network access point 220. In other examples, this information may be provided from eNB 230, depending on the split between AS and NAS signaling in the 5G evolved packet system.

When the new PDN connection (PDN2) is configured, the network entity informs (operation 835) UE 210 of the availability of PDN2 and invites the UE 210 to start using a new IP address/prefix (IP@2). This information may be provided either from a network entity in the C-plane cloud or from second eNB 230B, depending on the split between AS and NAS signaling in the 5G evolved packet system.

When IPv6 is used the eNB 230B, acting in the role of default IP router, sends (operation 840) a Router Advertisement (RA) message containing the new IPv6 prefix (IP@2) allowing the UE 210 to perform stateless address autoconfiguration with this prefix. The UE may optionally use Router Solicitation to trigger the RA.

Based on the information received during the configuration process the UE 210 starts using (operation 845) IP@2 for new traffic and moves traffic from existing applications (where possible) on the new IP interface by leveraging upper layer mobility mechanisms (e.g. SIP reINVITE, DASH, MPTCP).

Figure 9:
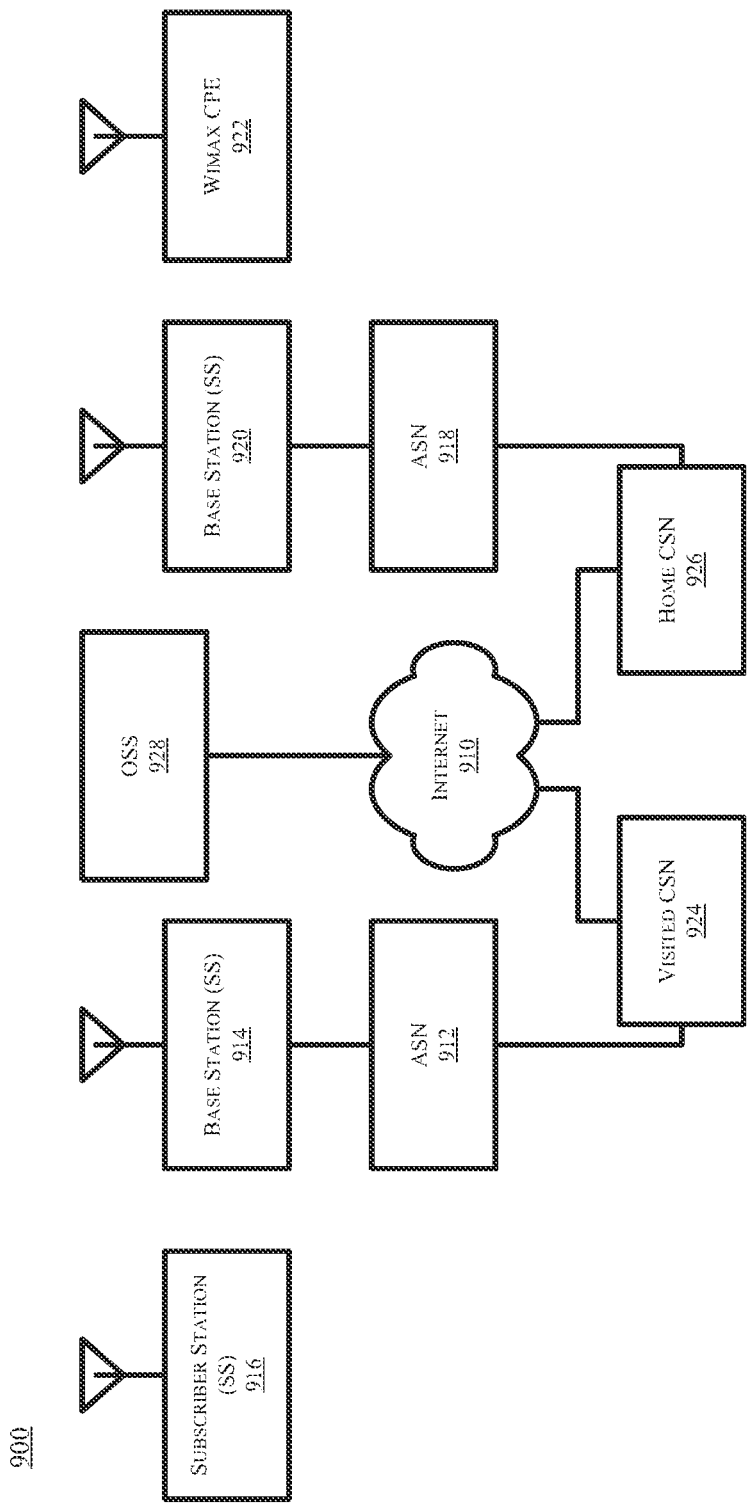
FIG. 9 is a schematic, block diagram illustration of a wireless network in accordance with one or more exemplary embodiments disclosed herein.

FIG. 9 is a schematic, block diagram illustration of a wireless network 900 in accordance with one or more exemplary embodiments disclosed herein. One or more of the elements of wireless network 900 may be capable of implementing methods to identify victims and aggressors according to the subject matter disclosed herein. As shown in FIG. 9, network 900 may be an Internet-Protocol-type (IP-type) network comprising an Internet-type network 910, or the like, that is capable of supporting mobile wireless access and/or fixed wireless access to Internet-type network 910.

In one or more examples, network 900 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 900 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 900 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 912 is capable of coupling with base station (BS) 914 to provide wireless communication between subscriber station (SS) 916 (also referred to herein as a wireless terminal) and Internet 910. In one example, subscriber station 916 may comprise a mobile-type device or information-handling system capable of wirelessly communicating via network 900, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 912 may implement profiles that are capable of defining the mapping of network functions to one or more physical entities on network 900. Base station 914 may comprise radio equipment to provide radio-frequency (RF) communication with subscriber station 916, and may comprise, for example, the physical layer (PHY) and media access control (MAC) layer equipment in compliance with an IEEE 802.16e-type standard. Base station 914 may further comprise an IP backplane to couple to Internet 910 via ASN 912, although the scope of the claimed subject matter is not limited in these respects.

Network 900 may further comprise a visited connectivity service network (CSN) 924 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 926, and the scope of the claimed subject matter is not limited in these respects.

Visited CSN 924 may be referred to as a visited CSN in the case, for example, in which visited CSN 924 is not part of the regular service provider of subscriber station 916, for example, in which subscriber station 916 is roaming away from its home CSN, such as home CSN 926, or, for example, in which network 900 is part of the regular service provider of subscriber station, but in which network 900 may be in another location or state that is not the main or home location of subscriber station 916.

In a fixed wireless arrangement, WiMAX-type customer premises equipment (CPE) 922 may be located in a home or business to provide home or business customer broadband access to Internet-type network 910 via base station 920, ASN 918, and home CSN 926 in a manner similar to access by subscriber station 916 via base station 914, ASN 912, and visited CSN 924, a difference being that WiMAX CPE 922 is generally disposed in a stationary location, although it may be moved to different locations as needed, whereas subscriber station may be utilized at one or more locations if subscriber station 916 is within range of base station 914 for example.

It should be noted that CPE 922 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 922 is capable of providing an uplink-transmit-power control technique that reduces interference experienced at other wireless devices according to the subject matter disclosed herein.

In accordance with one or more examples, operation support system (OSS) 928 may be part of network 900 to provide management functions for network 900 and to provide interfaces between functional entities of network 900. Network 900 of FIG. 9 is merely one type of wireless network showing a certain number of the components of network 900; however, the scope of the claimed subject matter is not limited in these respects.

Figure 10:
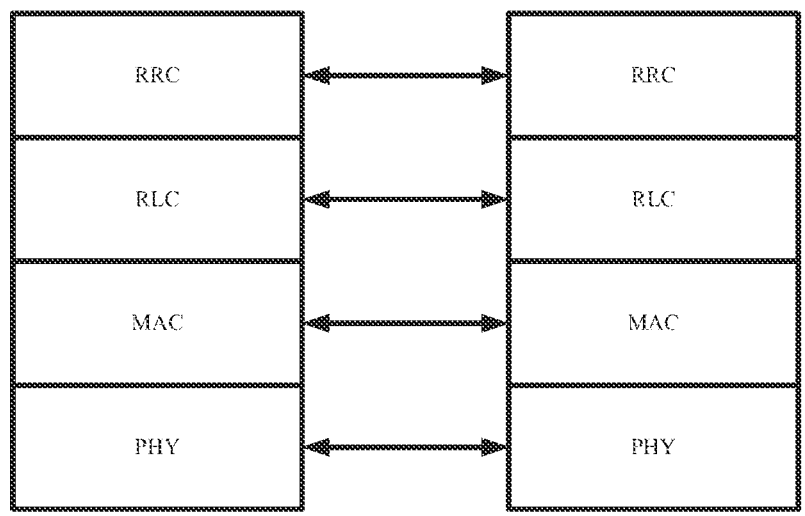
FIGS. 10 and 11 are schematic, block diagram illustrations, respectively, of radio interface protocol structures between a UE and an eNodeB based on a 3GPP-type radio access network standard in accordance with one or more exemplary embodiments disclosed herein.
Figure 11:
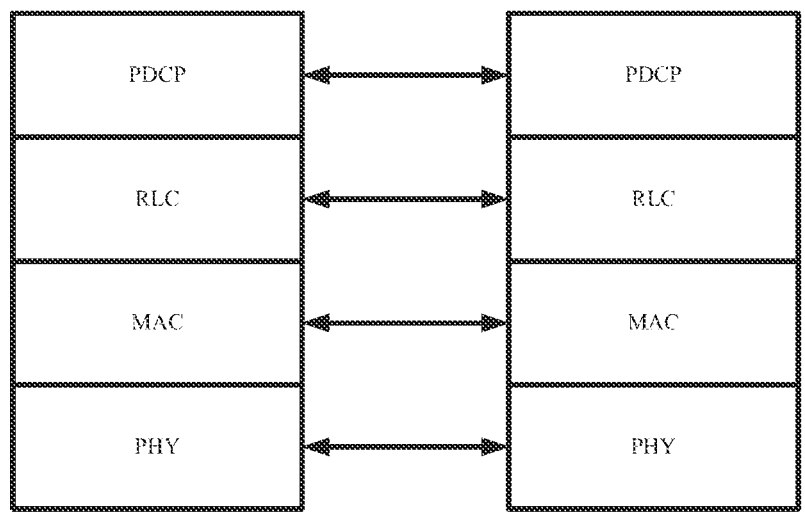

FIGS. 10 and 11 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 10 depicts individual layers of a radio protocol control plane and FIG. 11 depicts individual layers of a radio protocol user plane. The protocol layers of FIGS. 10 and 11 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 12:
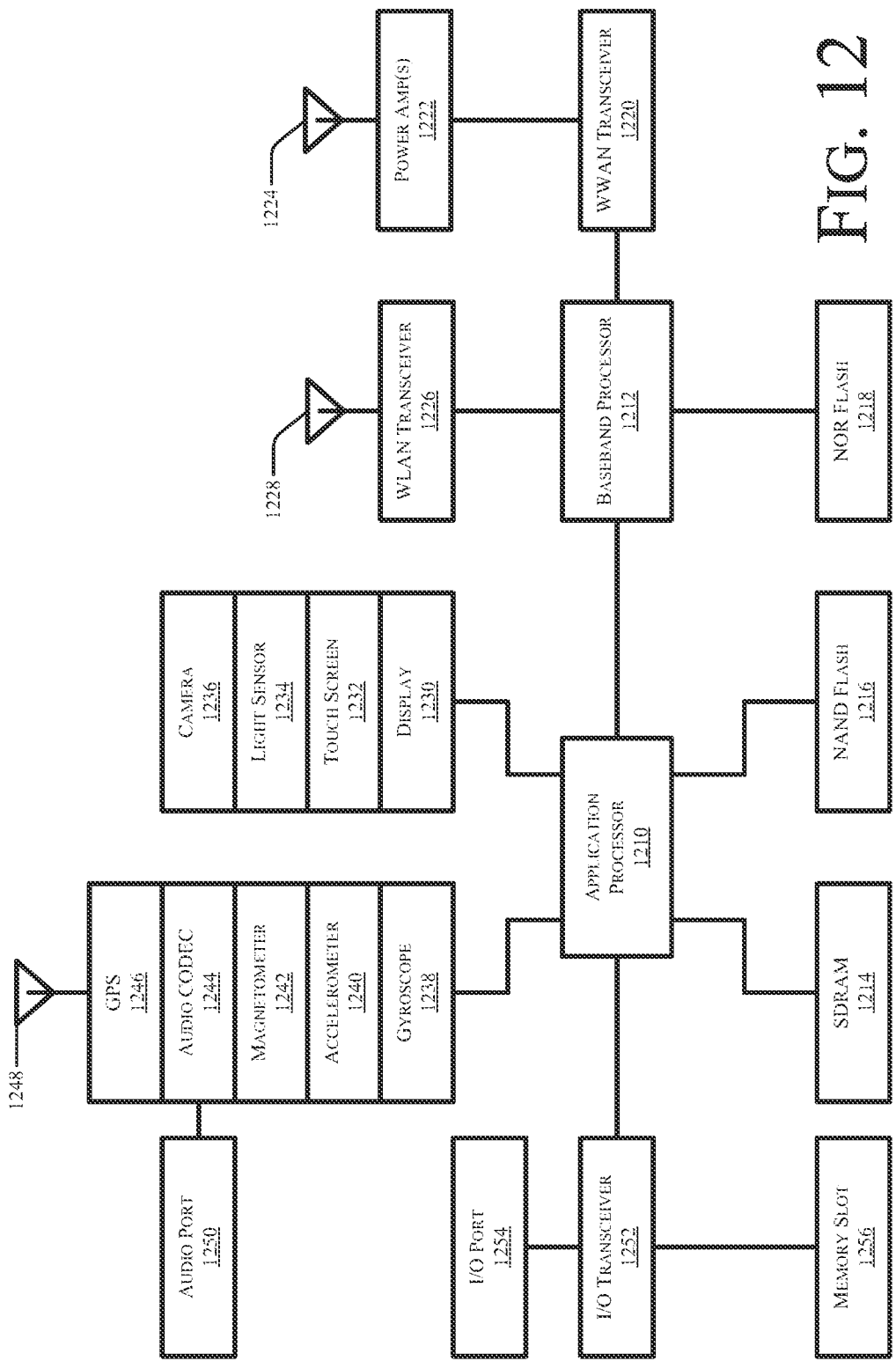
FIG. 12 is a schematic, block diagram illustration of an information-handling system in accordance with one or more exemplary embodiments disclosed herein.
Figure 13:
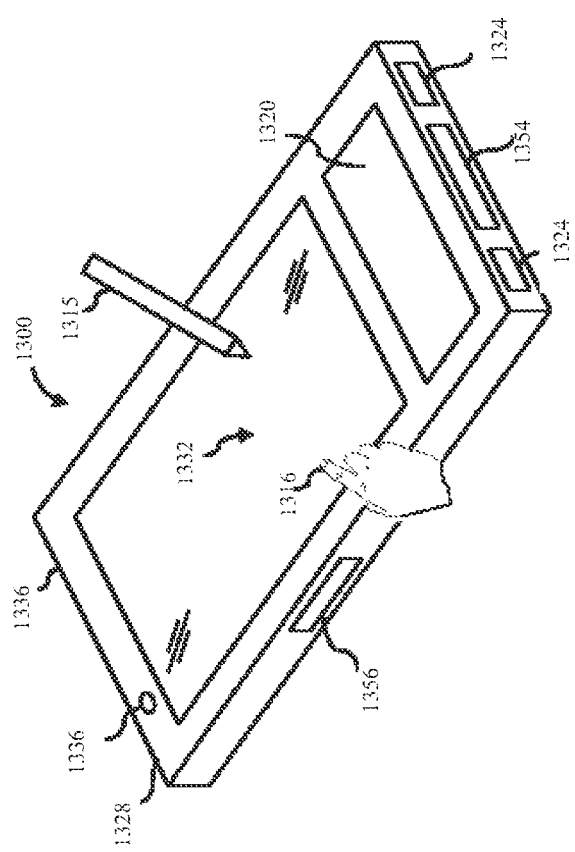
FIG. 13 is an isometric view of an exemplary embodiment of an information-handling system that optionally may include a touch screen in accordance with one or more embodiments disclosed herein.

FIG. 12 depicts an exemplary functional block diagram of an information-handling system 1200 that is capable of implementing methods to identify victims and aggressors according to the subject matter disclosed herein. Information handling system 1200 of FIG. 12 may tangibly embody one or more of any of the exemplary devices, exemplary network elements and/or functional entities of the network as shown in and described herein. In one example, information-handling system 1200 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 1200 is capable of providing an uplink-transmit-power control technique that reduces interference experienced at other wireless devices according to the subject matter disclosed herein. Although information-handling system 1200 represents one example of several types of computing platforms, information-handling system 1200 may include more or fewer elements and/or different arrangements of elements than shown in FIG. 12, and the scope of the claimed subject matter is not limited in these respects.

In one or more examples, information-handling system 1200 may comprise one or more applications processor 1210 and a baseband processor 1212. Applications processor 1210 may be utilized as a general purpose processor to run applications and the various subsystems for information-handling system 1200, and to capable of providing an uplink-transmit-power control technique that reduces interference experienced at other wireless devices according to the subject matter disclosed herein. Applications processor 1210 may include a single core or alternatively may include multiple processing cores wherein one or more of the cores may comprise a digital signal processor or digital signal processing core. Furthermore, applications processor 1210 may include a graphics processor or coprocessor disposed on the same chip, or alternatively a graphics processor coupled to applications processor 1210 may comprise a separate, discrete graphics chip. Applications processor 1210 may include on-board memory, such as cache memory, and further may be coupled to external memory devices such as synchronous dynamic random access memory (SDRAM) 1214 for storing and/or executing applications, such as capable of providing an uplink-transmit-power control technique that reduces interference experienced at other wireless devices according to the subject matter disclosed herein. During operation, and NAND flash 1216 for storing applications and/or data even when information-handling system 1200 is powered off.

In one example, a list of candidate nodes may be stored in SDRAM 1214 and/or NAND flash 1216. Further, applications processor 1210 may execute computer-readable instructions stored in SDRAM 1214 and/or NAND flash 1216 that result in an uplink-transmit-power control technique that reduces interference experienced at other wireless devices according to the subject matter disclosed herein.

In one example, baseband processor 1212 may control the broadband radio functions for information-handling system 1200. Baseband processor 1212 may store code for controlling such broadband radio functions in a NOR flash 1218. Baseband processor 1212 controls a wireless wide area network (WWAN) transceiver 1220 which is used for modulating and/or demodulating broadband network signals, for example, for communicating via a 3GPP LTE network or the like as discussed herein with respect to FIG. 12. The WWAN transceiver 1220 couples to one or more power amplifiers 1222 that are respectively coupled to one or more antennas 1224 for sending and receiving radio-frequency signals via the WWAN broadband network. The baseband processor 1212 also may control a wireless local area network (WLAN) transceiver 1226 coupled to one or more suitable antennas 1228 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1210 and baseband processor 1212, and the scope of the claimed subject matter is not limited in these respects. For example, any one or more of SDRAM 1214, NAND flash 1216 and/or NOR flash 1218 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1210 may drive a display 1230 for displaying various information or data, and may further receive touch input from a user via a touch screen 1232, for example, via a finger or a stylus. In one exemplary embodiment, touch screen 1232 display a menu and/or options to a user that are selectable via a finger and/or a stylus for entering information into information-handling system 1200.

An ambient light sensor 1234 may be utilized to detect an amount of ambient light in which information-handling system 1200 is operating, for example, to control a brightness or contrast value for display 1230 as a function of the intensity of ambient light detected by ambient light sensor 1234. One or more cameras 1236 may be utilized to capture images that are processed by applications processor 1210 and/or at least temporarily stored in NAND flash 1216. Furthermore, applications processor may be coupled to a gyroscope 1238, accelerometer 1240, magnetometer 1242, audio coder/decoder (CODEC) 1244, and/or global positioning system (GPS) controller 1246 coupled to an appropriate GPS antenna 1248, for detection of various environmental properties including location, movement, and/or orientation of information-handling system 1200. Alternatively, controller 1246 may comprise a Global Navigation Satellite System (GNSS) controller. Audio CODEC 1244 may be coupled to one or more audio ports 1250 to provide microphone input and speaker outputs either via internal devices and/or via external devices coupled to information-handling system via the audio ports 1250, for example, via a headphone and microphone jack. In addition, applications processor 1210 may couple to one or more input/output (I/O) transceivers 1252 to couple to one or more I/O ports 1254 such as a universal serial bus (USB) port, a high-definition multimedia interface (HDMI) port, a serial port, and so on. Furthermore, one or more of the I/O transceivers 1252 may couple to one or more memory slots 1256 for optional removable memory, such as secure digital (SD) card or a subscriber identity module (SIM) card, although the scope of the claimed subject matter is not limited in these respects.

FIG. 15 depicts an isometric view of an exemplary embodiment of the information-handling system of FIG. 12 that optionally may include a touch screen in accordance with one or more embodiments disclosed herein. FIG. 11 shows an example implementation of an information-handling system 1500 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1510 having a display 1030 that may include a touch screen 1032 for receiving tactile input control and commands via a finger 1516 of a user and/or a via stylus 1518 to control one or more applications processors 1210. The housing 1510 may house one or more components of information-handling system 1000, for example, one or more applications processors 1210, one or more of SDRAM 1214, NAND flash 1216, NOR flash 1218, baseband processor 1212, and/or WWAN transceiver 1220. The information-handling system 1500 further may optionally include a physical actuator area 1520 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1524 and a connection port 1554 for connecting the information-handling system 1500 to another electronic device, dock, display, battery charger, and so on. Additionally, information-handling system 1500 may include a headphone or speaker jack 1528 and one or more cameras 1536 on one or more sides of the housing 1510. It should be noted that the information-handling system 1500 of FIG. 15 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
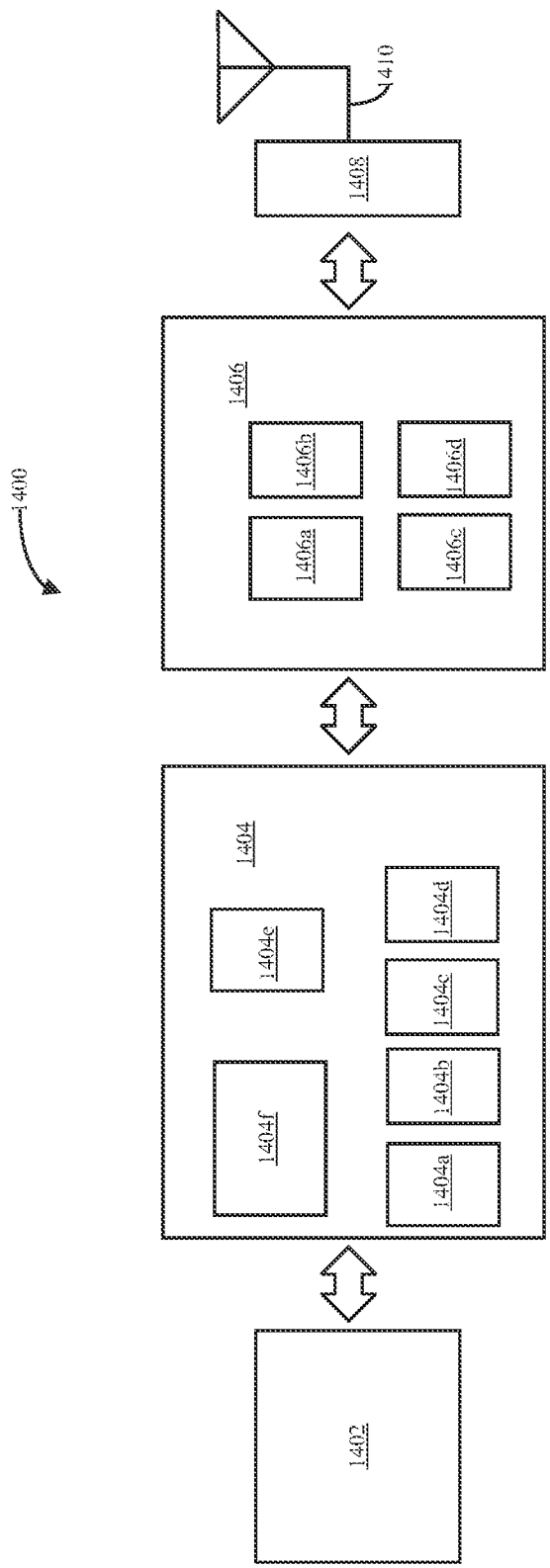
FIG. 14 is a schematic, block diagram illustration of components of a wireless device in accordance with one or more exemplary embodiments disclosed herein.

Embodiments described herein may be implemented into a system using any suitably configured hardware and/or software. FIG. 14 illustrates, for one embodiment, example components of a UE device 1400. In some embodiments, the UE device 1400 may include application circuitry 1402, baseband circuitry 1404, Radio Frequency (RF) circuitry 1406, front-end module (FEM) circuitry 1408 and one or more antennas 1410, coupled together at least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband circuitry 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404$a$, third generation (3G) baseband processor 1404$b$, fourth generation (4G) baseband processor 1404$c$, and/or other baseband processor(s) 1404$d$ for other existing generations, generations in development or to be developed in the future (e.g., fifth generation (5G), 6G, etc.). The baseband circuitry 1404 (e.g., one or more of baseband processors 1404$a$-$d$) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 1404$e$ of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP(s)) 1404$f$. The audio DSP(s) 1404$f$ may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an EUTRAN and/or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406a, amplifier circuitry 1406b and filter circuitry 1406c. The transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c. The filter circuitry 1406c may include a low-pass filter (LPF), although the scope of the embodiments is not limited in this respect.

In some embodiments, the mixer circuitry 1406a of the receive signal path and the mixer circuitry 1406a of the transmit signal path may include two or more mixers and may be arranged for quadrature downconversion and/or upconversion respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and/or direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the application circuitry 1402 depending on the desired output frequency. In some embodiments, a divider control input (e.g., N) may be determined from a look-up table based on a channel indicated by the application circuitry 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 may include additional elements such as, for example, memory/storage, display, camera, sensor, and/or input/output (I/O) interface.

The following pertains to further examples.

Example 1 is an apparatus of a network entity capable to manage a packet data network (PDN) connection for a user equipment (UE) comprising processing circuitry to determine to switch the UE from a first PDN connection managed by a first PDN gateway (P-GW) to a second PDN connection, select a second P-GW to manage the second PDN connection, generate configuration data for at least one network node in the second PDN connection and generate configuration data for an evolved NodeB (eNB) in the second PDN connection.

In example 2, the subject matter of example 1 can further comprise transmit circuitry to transmit to the UE an invitation to use the second PDN connection using at least one of an access stratum signaling or a non-access stratum signaling.

In example 3, the subject matter of any one of examples 1-2 can comprise processing circuitry configured to determine that the UE has moved from a first location proximate the first P-GW to a second location proximate to the second P-GW.

In example 4, the subject matter of any one of examples 3-4, can comprise transmit circuitry configured to provide the second P-GW with a tunnel endpoint transport address for the at least one network node in the second PDN connection.

In example 5, the subject matter of any one of examples 1-4, can comprise processing circuitry configured to allocate at least one of a new internet protocol (IP) address or IP prefix for the second PDN connection.

In example 6, the subject matter of any one of examples 1-5, can comprise processing circuitry is configured to provide at least one network node in the second PDN connection with a tunnel endpoint transport address for the eNB.

In example 7, the subject matter of any one of examples 1-6, can comprise processing circuitry is configured to provide the eNB with a tunnel endpoint transport address for the at least one network node in the second PDN connection and the at least one of a new IP address or IP prefix for the UE.

In example 8, the subject matter of any one of examples 1-7, can comprise transmit circuitry configured to send a router advertisement (RA) message to the UE containing at least a portion of the new IP prefix for the UE.

In example 9, the subject matter of any one of examples 1-8, can comprise an arrangement wherein the second PDN connection is established before the first PDN connection is terminated.

Example 10 is an apparatus of an evolved NodeB (eNB) capable to manage a packet data network (PDN) connection for a user equipment (UE), the eNB comprising processing circuitry to determine to switch a portion of the data traffic from the UE from a first PDN connection managed by a first packet data network gateway (P-GW) to a second PDN connection, and select a second P-GW to manage the second PDN connection.

In example 11, the subject matter of example 10 may further comprise transmit circuitry to forward at least a portion of an internet protocol (IP) address and a set of routing rules for the second PDN connection to a network entity associated with a control plane for the second PDN connection, transmit the at least a portion of an IP address and routing rules for the second PDN connection to the UE, and transmit to the UE an invitation to use the second PDN connection for selected data traffic determined by the set of routing rules using at least one of an access stratum signaling or a non-access stratum signaling.

In example 12, the subject matter of any one of examples 10-11 may comprise an arrangement in which the processing circuitry is configured to allocate a new IP address or IP prefix for the second PDN connection.

In example 13, the subject matter of any one of examples 10-12 may comprise an arrangement in which the processing circuitry is configured to send a router advertisement (RA) message containing at least a portion of the new IP prefix for the UE.

In example 14, the subject matter of any one of examples 10-13 may comprise an arrangement in the second PDN connection is established before the first PDN connection is terminated.

In example 15, the subject matter of any one of examples 10-14 may comprise an arrangement in which the second PDN connection provides access to a mobile edge computing server located in proximity with the eNB.

In example 16, the subject matter of any one of examples 10-15 may comprise an arrangement in which the set of routing rules for the second PDN connection comprises a prioritized list of IP addresses of the UE associated with a traffic selection filter that includes one or more IP header fields and/or a list of fully qualified domain names and/or a list of application identifiers.

Example 17 is an apparatus of a network access point comprising processing circuitry to receive a request from an evolved NodeB (eNB) which utilizes a first packet data network gateway (P-GW) to manage a first packet data network (PDN) connection with a user equipment (UE) to establish a second PDN connection with the UE using a second P-GW located in proximity with the network access point, and in response to the request, allocate an internet protocol (IP) address or IP prefix for the second P-GW located in proximity with the network access point.

In example 18, the subject matter example 17 may comprise transmit circuitry to forward the IP address for the P-GW located in proximity with the network access point to the eNB for further forwarding to a network entity associated with a control plane for the second PDN, and transmit to the UE an invitation to use the second PDN connection for a portion of the data traffic of the UE.

In example 19, the subject matter of any one of examples 17-18 may comprise an arrangement in which the transmit circuitry is configured to inform the eNB that the network access point is communicatively coupled to the second P-GW via X2 signaling.

In example 20, the subject matter of any one of examples 17-19 may comprise an arrangement in which the P-GW is co-located with the network access point.

In example 21, the subject matter of any one of examples 17-20 may comprise an arrangement in which the second network access point comprises a booster cell located within a service area covered by the eNB.

In example 22, the subject matter of any one of examples 17-21 may comprise transmit circuitry configured to send a router advertisement (RA) message containing at least a portion of the new IP prefix for the UE.

In example 23, the subject matter of any one of examples 17-22 may comprise an arrangement in which the second PDN connection is established before the first PDN connection is terminated.

Example 24 is an apparatus of an evolved NodeB (eNB) capable to manage a packet data network (PDN) connection for a user equipment (UE), the eNB comprising processing circuitry to determine to switch the UE from a first PDN connection managed by a first packet data network gateway (P-GW) communicatively coupled to the eNB to a second PDN connection managed by a second P-GW communicatively coupled to a network access point, and receive, from the network access point, at least one of an internet protocol (IP) address or IP prefix for the second P-GW located proximate the network access point.

In example 25, the subject matter of example 24 may comprise transmit circuitry to forward the at least one of an IP address or IP prefix for the second P-GW to a network entity associated with a control plane for the second PDN connection, forward the at least one of an IP address or an IP prefix and routing rules for the second PDN connection to the UE, and transmit to the UE an invitation to use the second PDN connection using at least one of an access stratum signaling or a non-access stratum signaling.

In example 26, the subject matter of any one of examples 24-25 may comprise processing circuitry configured to detect that the UE has entered a coverage area of the network access point.

In example 27, the subject matter of any one of examples 24-26 may comprise an arrangement in which the second PDN connection is established before the first PDN connection is terminated.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. One or more non-transitory, computer-readable media having instructions that, when executed by one or more processors, cause a control-plane network node to:
   determine to switch a user equipment (UE) from a first user plane function (UPF) node that is to anchor a first connection with a data network, wherein the first connection is associated with a first Internet protocol (IP) address or prefix;
   select a second UPF node that is to anchor a second connection with the data network, wherein the second connection is associated with a second IP address or prefix; and
   transmit an instruction to cause the UE to switch to the second UPF node,
   wherein one or more existing traffic flows are moved from the first connection to the second connection, and the first connection at least partially overlaps, in time, with the second connection.

2. The one or more non-transitory, computer-readable media of claim 1, wherein the instructions, when executed, further cause the control-plane network node to:
   transmit the instruction in a non-access stratum (NAS) message.

3. The one or more non-transitory, computer-readable media of claim 1, wherein the instructions, when executed, further cause the control-plane network node to:
   transmit at least a portion of the second IP address or prefix to the UE.

4. The one or more non-transitory, computer-readable media of claim 3, wherein to transmit at least the portion of the second IP address or prefix, the control-plane network node is to transmit a router advertisement message that includes an IPv6 prefix.

5. The one or more non-transitory, computer-readable media of claim 1, wherein the instructions, when executed, further cause the control-plane network node to: instruct one or more user-plane nodes to establish the second connection.

6. The one or more non-transitory, computer-readable media of claim 1, wherein the instructions, when executed, further cause the control-plane network node to:

determine to switch the UE from the first UPF node to the second UPF node based on a geographical proximity of the UE to the second UPF node.

7. The one or more non-transitory, computer-readable media of claim 1, wherein the instructions, when executed, further cause the control-plane network node to:
instruct the first UPF node to release the first connection.

8. One or more non-transitory, computer-readable media having instructions that, when executed by one or more processors, cause a user equipment (UE) to:
communicate with a data network via a first connection anchored by a first user plane function (UPF) node, the first connection associated with a first Internet Protocol (IP) address or prefix;
receive, from a control-plane network node, an instruction to establish a second connection to communicate with the data network;
establish the second connection based on the instruction, wherein the second connection is anchored by a second UPF node and is associated with a second IP address or prefix; and
move one or more existing traffic flows from the first connection to the second connection, wherein the first connection at least partially overlaps, in time, with the second connection.

9. The one or more non-transitory, computer-readable media of claim 8, wherein the instructions, when executed, further cause the UE to:
process a non-access stratum (NAS) message to receive the instruction.

10. The one or more non-transitory, computer-readable media of claim 8, wherein the instructions, when executed, further cause the UE to:
receive at least a portion of the second IP address or prefix from the control-plane network node.

11. The one or more non-transitory, computer-readable media of claim 10, wherein to receive at least the portion of the second IP address or prefix, the UE is to process a router advertisement message.

12. The one or more non-transitory, computer-readable media of claim 11, wherein the second IP address or prefix includes an IPv6 prefix.

13. The one or more non-transitory, computer-readable media of claim 8, wherein the instructions, when executed, further cause the UE to:
receive routing rules; and
transmit, based on the routing rules, data from an application via the second connection.

14. A method of operating a control-plane network node, the method comprising:
determining to switch a user equipment (UE) from a first user plane function (UPF) node that is to anchor a first connection with a data network, wherein the first connection is associated with a first Internet protocol (IP) address or prefix;
selecting a second UPF node that is to anchor a second connection with the data network, wherein the second connection is associated with a second IP address or prefix; and
transmitting an instruction to cause the UE to switch to the second UPF node,
wherein one or more existing traffic flows are moved from the first connection to the second connection, and the first connection at least partially overlaps, in time, with the second connection.

15. The method of claim 14, further comprising:
transmitting the instruction in a non-access stratum (NAS) message.

16. The method of claim 14, further comprising:
transmitting at least a portion of the second IP address or prefix to the UE.

17. A method of operating a user equipment (UE), the method comprising:
communicating with a data network via a first connection anchored by a first user plane function (UPF) node, the first connection associated with a first Internet Protocol (IP) address or prefix;
receiving, from a control-plane network node, an instruction to establish a second connection to communicate with the data network;
establishing the second connection based on the instruction, wherein the second connection is anchored by a second UPF node and is associated with a second IP address or prefix; and
moving one or more existing traffic flows from the first connection to the second connection, wherein the first connection at least partially overlaps, in time, with the second connection.

18. The method of claim 17, further comprising:
receiving at least a portion of the second IP address or prefix from the control-plane network node.

19. The method of claim 18, wherein the second IP address or prefix includes an IPv6 prefix and said receiving at least the portion of the second IP address or prefix comprises:
processing a router advertisement message.

* * * * *